United States Patent [19]

Nelson

[11] Patent Number: 5,691,883
[45] Date of Patent: Nov. 25, 1997

[54] MULTIPLE INTAKE DUCT MICROPROCESSOR COOLING SYSTEM

[75] Inventor: Daryl J. Nelson, Beaverton, Oreg.

[73] Assignee: Intel Corporation, Santa Clara, Calif.

[21] Appl. No.: 578,984

[22] Filed: Dec. 27, 1995

[51] Int. Cl.$^6$ ........................................ H05K 7/20
[52] U.S. Cl. .................. 361/697; 165/80.3; 165/122; 312/236; 361/687
[58] Field of Search .............. 312/236; 174/15.1, 174/16.1; 165/121, 146, 122–126, 80.3; 454/184; 257/712, 713, 721, 722; 361/687, 690, 694–697, 717–719

[56] References Cited

U.S. PATENT DOCUMENTS

| | | | |
|---|---|---|---|
| 4,327,398 | 4/1982 | Christison | 361/384 |
| 4,644,443 | 2/1987 | Swensen et al. | 361/384 |
| 4,894,749 | 1/1990 | Elko et al. | 361/383 |
| 5,297,005 | 3/1994 | Gourdine | 361/697 |
| 5,335,144 | 8/1994 | Maroushek | 174/16.1 |
| 5,409,352 | 4/1995 | Lin | 415/177 |
| 5,422,787 | 6/1995 | Gourdine | 361/695 |
| 5,424,913 | 6/1995 | Swindler | 361/687 |
| 5,424,915 | 6/1995 | Katooka | 361/695 |
| 5,471,099 | 11/1995 | Larabell | 361/695 |
| 5,559,673 | 9/1996 | Gagnor | 361/695 |

*Primary Examiner*—Gerald P. Tolin
*Attorney, Agent, or Firm*—Blakely, Sokoloff, Taylor & Zafman

[57] ABSTRACT

An apparatus for cooling the components within an enclosed computer system. The apparatus includes a first compartment containing a power supply and a fan, a second compartment containing a variety of electrical components and an air duct containing the computer system microprocessor. The air duct directs an air flow from the exterior of the computer system enclosure across the microprocessor to an inlet opening of the first compartment. Holes are provided within the air duct at points downstream of the microprocessor to permit an air flow from the second compartment into the air duct. The fan generates an air stream through the cooling system and exhausts to the exterior of the computer system enclosure.

13 Claims, 5 Drawing Sheets

MULTIPLE INTAKE DUCT MICROPROCESSOR COOLING SYSTEM

FIELD OF THE INVENTION

The present invention relates to an apparatus for cooling components within a computer system enclosure. More specifically, the invention relates to an apparatus for cooling the enclosure of a computer system that minimizes acoustic noise while maximizing the transfer of heat out of the enclosure.

BACKGROUND OF THE INVENTION

Integrated circuits (ICs) are typically housed within a plastic or ceramic package. The packages have leads or surface pads that are soldered to a printed circuit board. The circuit board and package are often located within an enclosed computer chassis that contains other circuitry associated with the computer system such as peripherals, memory cards, video cards, power supplies, etc. The computer chassis typically contains fans that remove the heat generated by the IC and other system components.

It is desirable to have a high rate of heat transfer from the IC package in order to maintain the junction temperatures of the IC within safe operating limits. Modern microprocessors typically employ millions of transistors in internal circuitry that require some type of cooling mechanism, otherwise, excessive junction temperatures may affect the performance of the circuit and cause permanent degradation of the device. Hence, as the performance of integrated circuits continue to expand, the need to provide more efficient, reliable and cost effective heat removal methods has become increasingly important in the design of computer system enclosures. One prior art system utilizing forced air convection cooling in a computer system enclosure is shown in FIG. 1.

FIG. 1 illustrates a top view of a typical desktop computer system enclosure in a cutaway view. Computer system enclosure 30 houses all the components of the computer system, including peripherals 44, cards 36, power supply 37 and processor 34. The computer system enclosure 30 may utilize a partition such as 46 to separate the processor and component circuitry section 38 from enclosures 31 and 48 that contain peripherals 44 (disk drives, etc.) and power supply 37, respectively, The prior art computer system enclosure of FIG. 1 uses two fans to provide forced air convection cooling of the computer system components. Air flow is achieved through section 38 by drawing air through the front of enclosure 30 via fan 33. As shown, cool, exterior air is drawn into the enclosure and initially passes over processor 34 in order to minimize the air temperature passing over the processor. In this manner, the heat transfer of processor 34 is maximized. This air flow is indicated by arrows 50. The cooling system of FIG. 1 also includes a second fan 32 that is located within compartment 31 for cooling power supply 37 and peripheral components 44. The air flow provided by fan 32 is indicated by arrows 51.

Although the cooling method and system of FIG. 1 is well established, there are a number of problems associated with using two fans to cool the interior of a computer system enclosure. First, the use of two fans causes an increase in the perceptible noise heard by an operator. The use of a second system fan adds, at a minimum, 3 dB to the overall sound pressure level of the system. In addition, the use of a second fan increases the overall costs of the computer system. Moreover, the probability of a fan failure in a dual fan system is twice that of a single fan system.

What is needed then is an apparatus and method which solves the aforementioned problems associated with using a two fan cooling system within a computer system enclosure.

SUMMARY OF THE INVENTION

An improved apparatus and method for cooling the components located within a computer system enclosure is disclosed. In one embodiment the enclosure of the present invention includes a first compartment containing a power supply and a fan, a second compartment containing a variety of electrical components, and an air duct containing the computer system microprocessor. In accordance with the present invention, the air duct directs an air flow from the exterior of the computer system enclosure across the microprocessor to an inlet opening of the first compartment. Holes are provided within the air duct at a point downstream of the microprocessor to permit an air flow from the second compartment into the air duct. The fan within the power supply compartment generates an air stream through the cooling system and exhausts to the exterior of the computer system enclosure. Hence, the present invention provides a single fan cooling apparatus and method that maximizes the heat transfer rate across the various components located within a computer system enclosure while minimizing the acoustic noise generated by the computer system.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An apparatus and method for cooling the components located within a computer system enclosure is described. In the following description, numerous specific details are set forth such as material types, dimensions, etc., in order to provide a thorough understanding of the present invention. However, it will be obvious to one of skill in the art that the invention may be practiced without these specific details. In other instances, well known elements have not been shown in particular detail in order to avoid unnecessarily obscuring the present invention.

Figure 1:
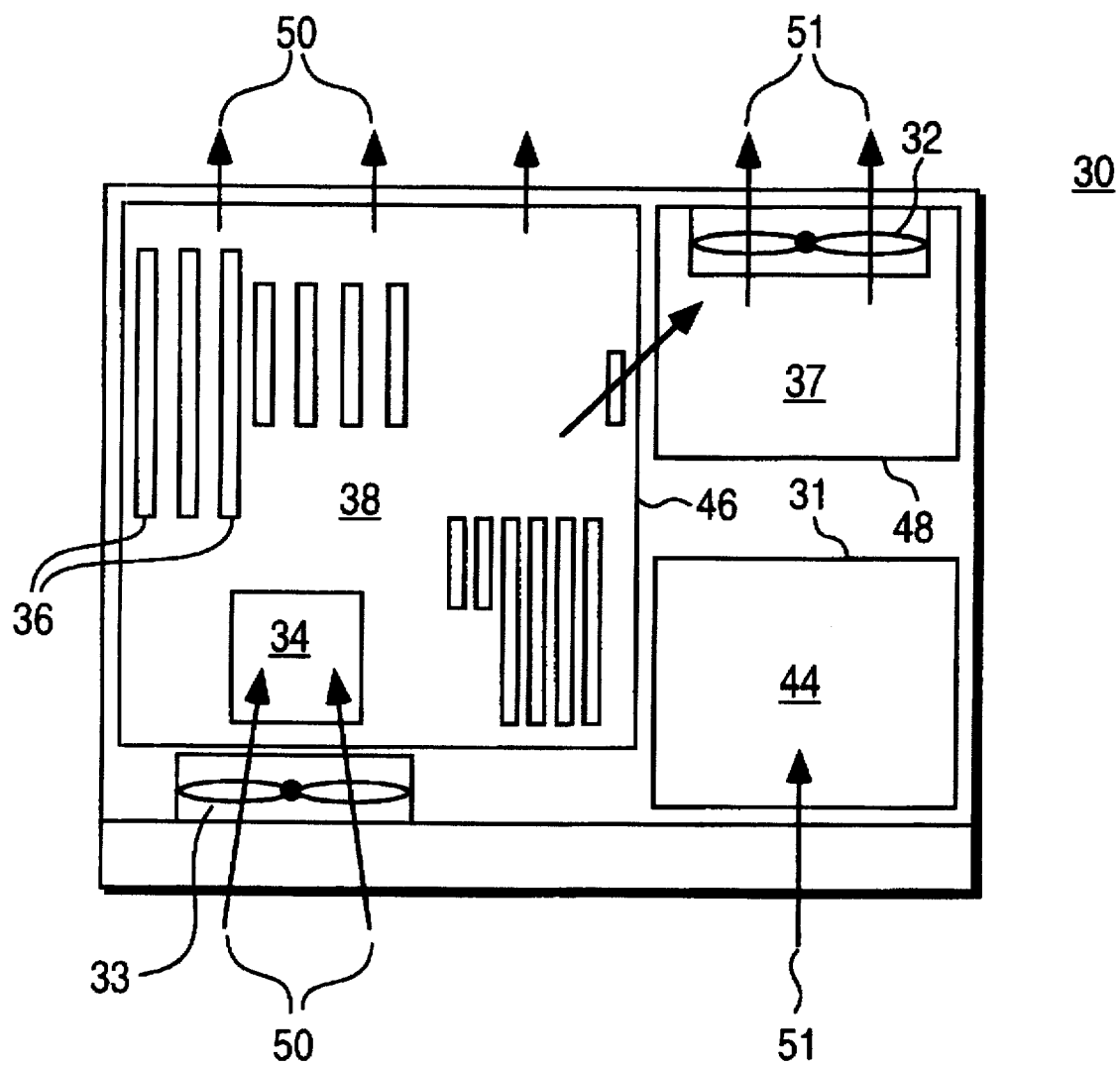
FIG. 1 illustrates a top view of a prior art computer system enclosure in a cutaway view.
Figure 2A:
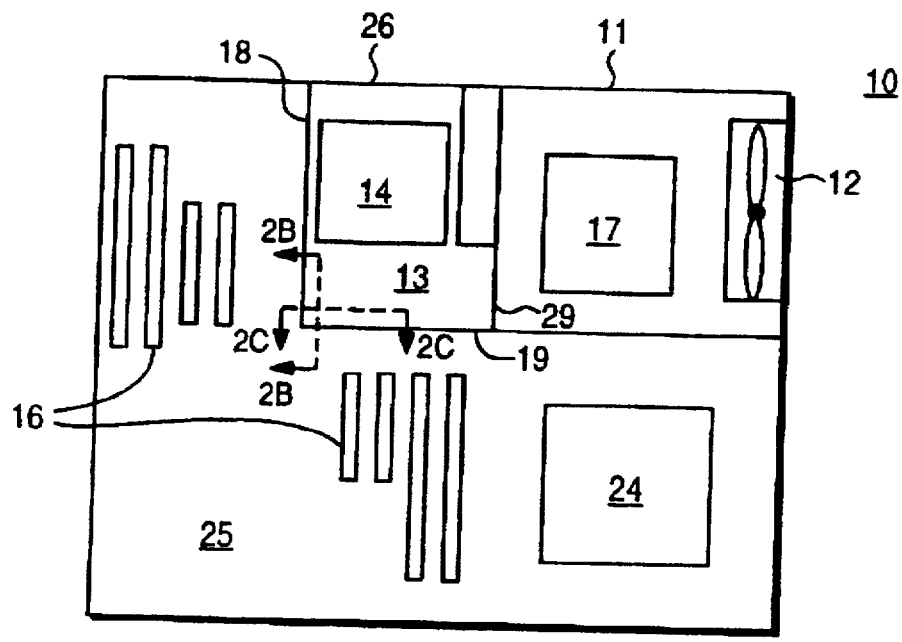
FIG. 2A illustrates a top view of a computer system enclosure in one embodiment of the present invention.

FIG. 2A illustrates a top view of one embodiment of the present invention. Enclosure 10 comprises a variety of components including, a power supply 17, microprocessor 14, peripherals 24 and cards 16. Cards 16 may comprise any of a number of components, such as, for example, memory cards, modem cards, video cards, daughter boards, etc. Peripherals 24 may include a floppy or hard disk drive or a number of other peripheral devices commonly known in the art.

Enclosure 10 is divided primarily into three sections. These include card slot and peripheral compartment 25, power supply compartment 11, and air duct 13. As illustrated, compartment 25 contains peripherals 24 and cards 16. Compartment 11 contains power supply 17 and the cooling system fan 12. Air duct 13 houses the computer system processor 14.

As previously described, the cooling fan 12 of the present invention resides in power supply compartment 11. Fan 12 pulls air into enclosure 10 by creating a low pressure zone within the power supply compartment 11. A salient feature of the present invention lies in the manner in which air flow is controlled and directed through enclosure 10.

As noted earlier, modern microprocessors employ millions of transistors in internal circuitry and operate at ever increasing speeds. As a result, the amount of heat generated by modern microprocessor devices has increased significantly. In the present invention, air duct 13 provides an air flow path from opening 26, at the exterior of enclosure 10, to an inlet opening 29 of compartment 11. The air duct is configured to direct cool air from the exterior of enclosure 10 across processor 14. By passing cool, unheated air over processor 14, a maximum achievable heat transfer is established across the processor. This assures that the junction temperature of the processor is maintained within safe operating limits. As the air flow passes over processor 14 it is heated. The heated air then passes along air duct 13 into compartment 11 through opening 29. It is appreciated that a heat sink (not shown) may be attached to processor 14 to further enhance the transfer of heat away from the device.

Figure 2B:
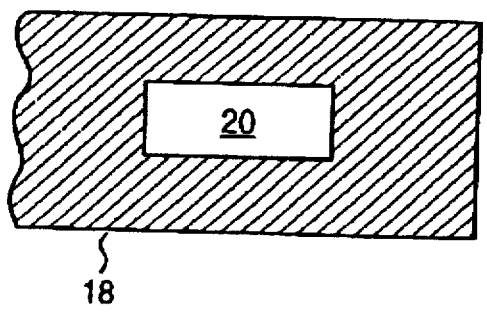
FIG. 2B illustrates a cross-sectional view of wall 18 along line 2B—2B.
Figure 2C:
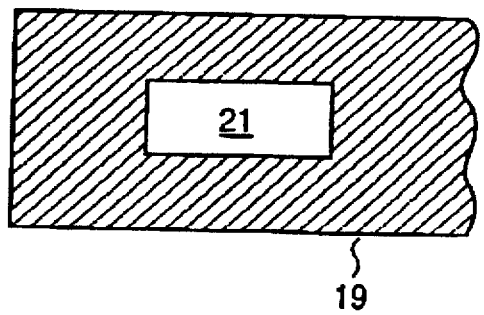
FIG. 2C illustrates a cross-sectional view of wall 19 along line 2C—2C.

To provide cooling to compartment 25, an air flow is established by providing openings 20 and 21 within air duct walls 18 and 19, respectively. (See FIGS. 2B and 2C.) It is important to note that openings 20 and 21 are positioned downstream of processor 14 to ensure that only cool exterior air passes over processor 14. In accordance with the present invention, a plurality of intake air ducts (not shown) are positioned about the exterior walls of compartment 25. Air passes through the air intake vents and over the internal electronics located within compartment 25. The heated air is then drawn through openings 20 and 21 into air duct 13. The combined heated air from compartment 25 and processor 14 is passed into compartment 11 through opening 29. The air flow passing through compartment 11 acts to cool power supply 17 and is eventually exhausted by fan 12 to the exterior of enclosure 10.

The size and shape of duct openings 26, 20 and 21 will vary depending upon the particular cooling requirements of the enclosure components. The proportion of air passing over processor 14 and through compartment 25 is balanced such that the components of compartment 25 and processor 14 receive sufficient cooling air. In an embodiment where the airflow is proportioned equally among processor 14 and compartment 25, the combined area of openings 20 and 21 will be approximately equal to the surface area of opening 26. It is also appreciated that duct openings 20 and 21 may take upon any of a variety of geometric shapes and may be positioned anywhere along air duct 13 so long as they are located downstream of processor 14.

Figure 3:
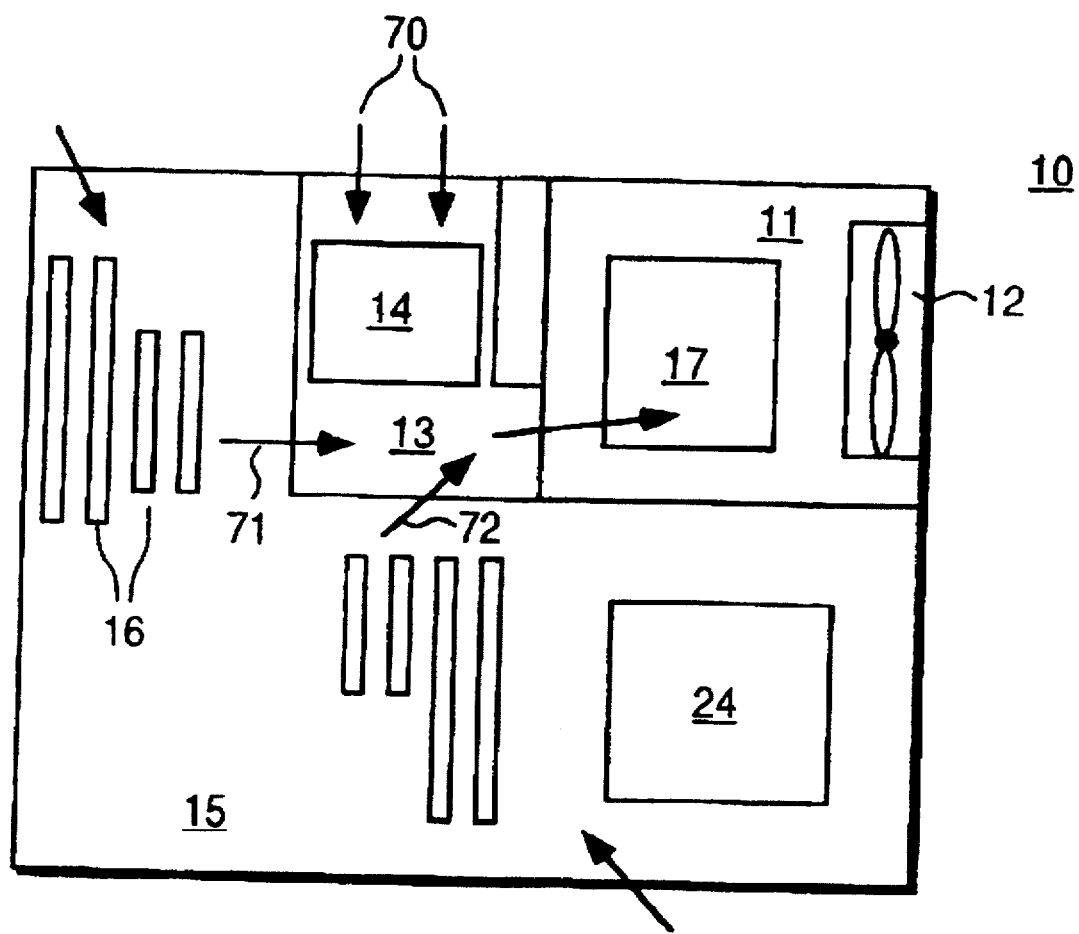
FIG. 3 illustrates the computer system enclosure of FIG. 1 with arrows indicating the air flow through the enclosure.

Referring to FIG. 3, the embodiment of FIG. 2 is shown having arrows that indicate the air flow through the enclosure. As illustrated, air duct 13 has a multiple air intake. As shown, air duct 13 has a first air intake 70 from the exterior of enclosure 10 and a second and third air intake 71 through openings 20 and 21, respectively.

Figure 4:
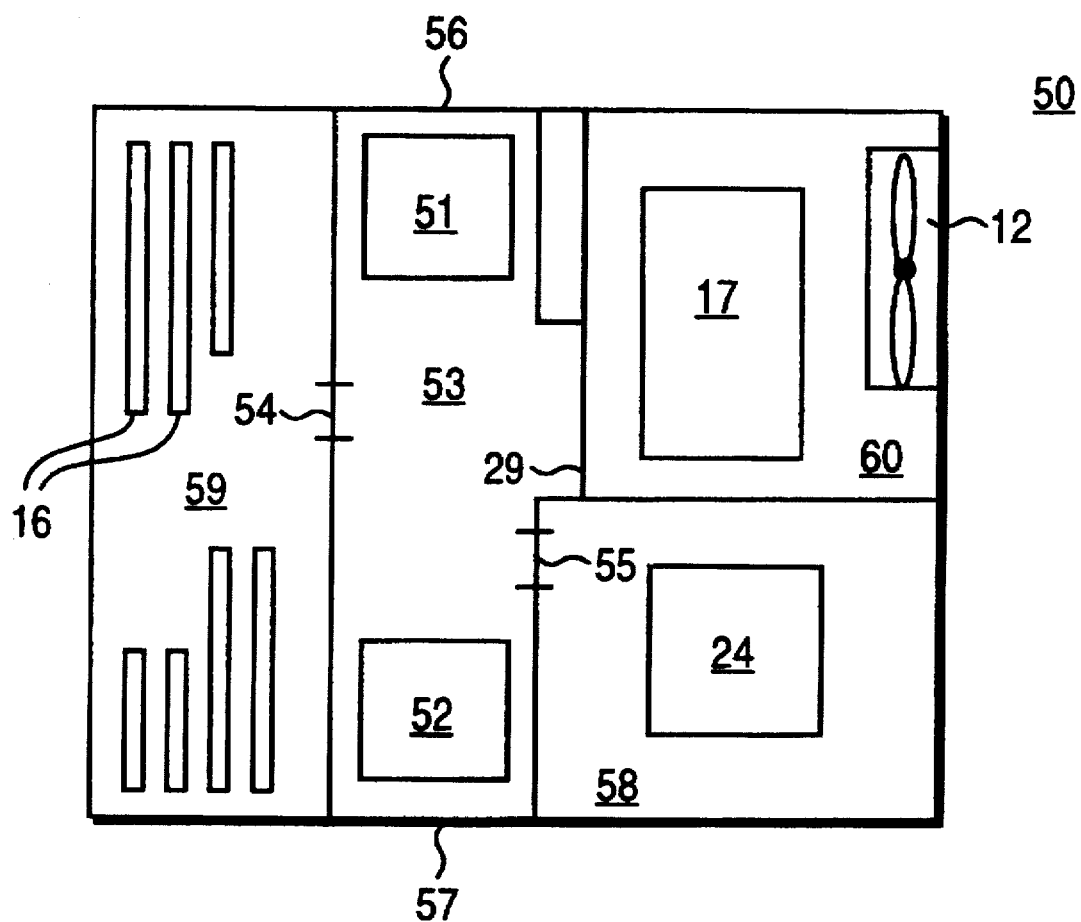
FIG. 4 illustrates a top view of a computer system enclosure in another embodiment of the present invention.

FIG. 4 illustrates another embodiment of the present invention wherein enclosure 50 contains two microprocessors 51 and 52. As shown, an air duct 53 includes two air intakes 56 and 57 at the exterior of enclosure 50. The two exterior air intakes are included to provide cool, unheated air across processors 51 and 52.

With continuing reference to FIG. 4, openings 54 and 55 are provided within air duct 53 to provide an air path from compartments 58 and 59 into duct 53. In this manner, air is drawn through openings 54 and 55 to create an air flow across compartments 58 and 59 to cool electrical components 16 and 24 contained therein. Air intake vents (not shown) are strategically dispersed around the exterior walls of enclosure 50 to facilitate the introduction of cool exterior air into compartments 58 and 59. The combined heated air from compartments 58 and 59 and processors 51 and 52 is passed into compartment 11 through opening 29. The air then passes through compartment 60 to cool power supply 17. The heated air is then exhausted by fan 12 to the exterior of enclosure 50.

The size and shape of duct openings 54, 55, 56 and 57 will vary depending upon the particular cooling requirements of the enclosure components. The amount of air passing through each opening is essentially dependent on the size and shape of the opening. Therefore, one method for balancing the airflow across the various enclosure components is to vary the size and/or shape of the opening. Another method may include varying the location of the opening along air duct 53. It is important to note, however, that openings 54 and 55 must be located at a point downstream of processors 51 and 52 such that no heated air is permitted to pass over the processors.

In the foregoing description a cooling system for a computer system enclosure has been described wherein the system fan resides within the power supply compartment. It should be understood, however, that the fan need not reside in the power supply. For example, to implement the present invention as depicted in FIG. 2, fan 12 need only be placed in a position such that a low pressure zone is created at a point downstream of processor 14 and openings 20 and 21.

Figure 5:
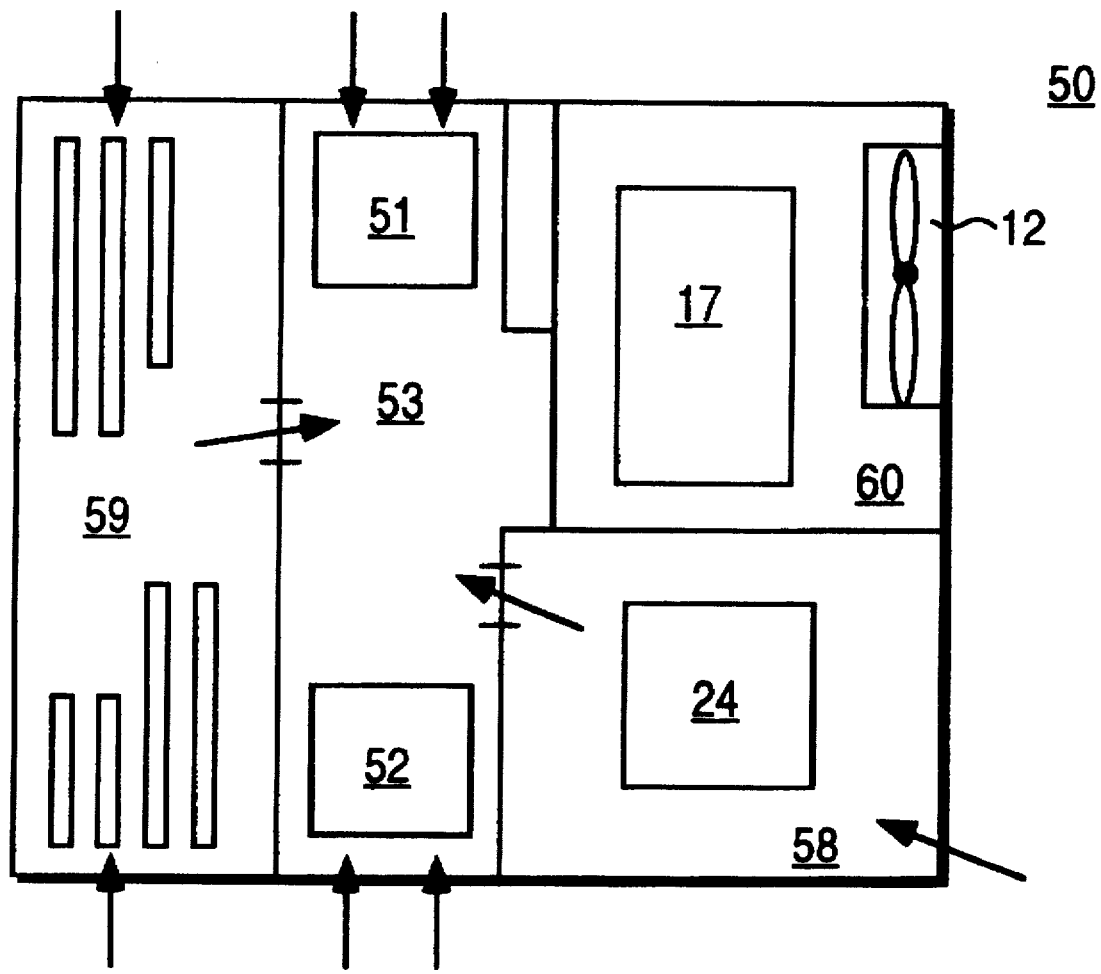
FIG. 5 illustrates the computer system enclosure of FIG. 4 with arrows indicating the air flow through the enclosure.

FIG. 5 illustrates the embodiment of FIG. 4 having arrows that indicate the air flow through the enclosure.

Thus, an improved cooling system for a computer system enclosure has been described. Although the present invention has been described particularly with reference to FIGS. 2 through 5, it will be apparent to one skilled in the art that the present invention any of a number of other cooling system configurations using a multiple intake air duct may be used. It is contemplated that many changes and modifications may be made by one of ordinary skill in the art without departing from the spirit and scope of the present invention.

What is claimed is:

1. In a computer system enclosure containing a processor, a power supply and at least one electrical component, a cooling system comprising:

an air duct containing said processor, said air duct directing a first air flow from the exterior of said enclosure over said processor to an inlet opening of a first compartment containing said power supply, said air duct further comprising a second opening downstream of said processor coupling second air flow from a second compartment containing said electrical component into said air duct; and an air moving device disposed within said first compartment, said air moving device having an air exhaust to the exterior of said enclosure.

2. The cooling system of claim 1 wherein said air moving device is a variable speed fan.

3. The cooling system of claim 1 wherein said processor includes a heat sink.

4. The cooling system of claim 1 wherein said air moving device is a fan.

5. A computer system enclosure containing an integrated circuit package, power supply and at least one electrical component, said enclosure comprising:

- a first compartment containing said power supply, said first compartment having a first and second opening;
- an air moving device disposed within said first compartment, said air moving device having an air exhaust through said second opening to the exterior of said enclosure;
- a second compartment containing said electrical component; and
- an air duct containing said integrated circuit package, said air duct directing a first air flow from the exterior of said enclosure to said first opening of said first compartment, said air duct further comprising a third opening coupling second air flow from said second compartment into said air duct.

6. The assembly of claim 5 wherein said air moving device is a variable speed fan.

7. The assembly of claim 5 wherein said integrated circuit package includes a heat sink.

8. The assembly of claim 5 wherein said integrated circuit package is a microprocessor.

9. The assembly of claim 4 wherein said air moving device is a fan.

10. In a computer system enclosure containing a processor, power supply and at least one electrical component, a cooling system comprising:

- an air duct containing said processor and directing a first air flow from the exterior of said enclosure over said processor to an inlet opening of a first compartment containing said power supply, said air duct further comprising a second opening downstream of said processor coupling second air flow from a second compartment containing said electrical component into said first compartment via said duct, and
- air moving means disposed within said first compartment for providing air movement through said cooling system, said air moving means having an air exhaust to the exterior of said enclosure.

11. The cooling system of claim 10 wherein said air moving means comprises a fan.

12. The cooling system of claim 10 wherein said air moving means comprises a variable speed fan.

13. The cooling system of claim 10 wherein said processor includes a heat sink.

* * * * *